United States Patent
Dongle et al.

(10) Patent No.: US 12,423,444 B2
(45) Date of Patent: Sep. 23, 2025

(54) SYSTEM FOR SOFTWARE CODE CYBER SECURITY BASED ON MACHINE LEARNING VULNERABILITY DETECTION AND GENERATION AND IMPLEMENTATION OF VULNERABILITY TEST

(71) Applicant: BANK OF AMERICA CORPORATION, Charlotte, NC (US)

(72) Inventors: Panduranga Dongle, Telangana (IN); John Iruvanti, Telangana (IN); Komuraiah Kannaveni, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 154 days.

(21) Appl. No.: 18/498,379

(22) Filed: Oct. 31, 2023

(65) Prior Publication Data
US 2025/0139252 A1  May 1, 2025

(51) Int. Cl.
*G06F 21/57* (2013.01)
*G06N 20/00* (2019.01)

(52) U.S. Cl.
CPC .......... *G06F 21/577* (2013.01); *G06N 20/00* (2019.01); *G06F 2221/034* (2013.01)

(58) Field of Classification Search
CPC .............. G06F 21/577; G06F 2221/00; G06F 2221/033
See application file for complete search history.

(56) References Cited

U.S. PATENT DOCUMENTS

| | | | |
|---|---|---|---|
| 8,613,080 B2 | 12/2013 | Wysopal et al. | |
| 9,195,833 B2 | 11/2015 | Chestna | |
| 10,275,600 B2 | 4/2019 | Wysopal et al. | |
| 10,467,419 B1 | 11/2019 | Youngberg et al. | |
| 10,706,156 B2 | 7/2020 | Bhalla et al. | |
| 11,307,971 B1* | 4/2022 | Weldemariam | G06F 16/2379 |
| 11,750,640 B2 | 9/2023 | Oberg et al. | |
| 12,099,826 B2* | 9/2024 | Manley | G06F 8/65 |
| 12,267,345 B1* | 4/2025 | Erlingsson | G06F 9/5072 |
| 2005/0273860 A1* | 12/2005 | Chess | G06F 21/577 726/25 |
| 2009/0100518 A1 | 4/2009 | Overcash | |
| 2019/0138431 A1* | 5/2019 | Holbrook | G06F 8/65 |
| 2020/0042715 A1* | 2/2020 | Davidi | G06F 21/572 |
| 2020/0320202 A1* | 10/2020 | Farkash | G06N 20/00 |

(Continued)

*Primary Examiner* — Hieu T Hoang
(74) *Attorney, Agent, or Firm* — Moore & Van Allen PLLC; Anup Iyer

(57) ABSTRACT

An end-to-end approach for (i) identifying potential vulnerabilities in software applications, including security vulnerabilities, (ii) verifying/confirming the potential vulnerabilities as actual vulnerabilities and (iii) in response, identifying the necessary remedial actions necessary to eliminate or at least mitigate the vulnerabilities. An intelligent agent is implemented that is configured to detect a change to the application's code or computing environment and, as a result of detection of changes to the code or computing environment, identify potential vulnerabilities, verify/confirm the potential vulnerabilities as actual vulnerabilities through determination/creation of vulnerability test cases and automatically identify the necessary remedial actions necessary to eliminate or mitigate the vulnerabilities.

20 Claims, 6 Drawing Sheets

(56) References Cited

U.S. PATENT DOCUMENTS

| | | | |
|---|---|---|---|
| 2021/0019249 A1* | 1/2021 | Gnaneswaran | G06N 20/20 |
| 2021/0042217 A1* | 2/2021 | Hwang | G06F 11/3604 |
| 2021/0110047 A1* | 4/2021 | Fang | G06N 20/00 |
| 2022/0164175 A1* | 5/2022 | Masis | G06F 3/0484 |
| 2022/0382865 A1* | 12/2022 | Duplys | G06F 21/554 |
| 2023/0169177 A1* | 6/2023 | Bishop, III | G06F 8/71 |
| | | | 726/25 |
| 2023/0177170 A1 | 6/2023 | Olson et al. | |
| 2023/0259635 A1* | 8/2023 | Bao | G06F 21/552 |
| | | | 726/22 |
| 2024/0411542 A1* | 12/2024 | Goyal | G06F 8/433 |
| 2024/0419917 A1* | 12/2024 | Clement | G06N 3/045 |
| 2025/0005162 A1* | 1/2025 | Baker | G06F 21/577 |
| 2025/0013753 A1* | 1/2025 | Conway | G06F 21/577 |
| 2025/0045410 A1* | 2/2025 | Guajardo Merchan | G06F 21/577 |
| 2025/0077681 A1* | 3/2025 | Sen | G06F 8/61 |

* cited by examiner

SYSTEM FOR SOFTWARE CODE CYBER SECURITY BASED ON MACHINE LEARNING VULNERABILITY DETECTION AND GENERATION AND IMPLEMENTATION OF VULNERABILITY TEST

FIELD OF THE INVENTION

The present invention is related generally to software code security and, more specifically, and end-to-end process for identifying, confirming, and initiating remediation of vulnerabilities in software applications in response to detecting a change in the code or the computing environment.

BACKGROUND

Unlawful cyber wrongdoing refers to any activities involving computer systems, networks and digital technologies for purposes of committing illegal actions or harm to individuals, organizations or the like. For example, wrongdoers may gain unauthorized access to computer systems or networks to wrongfully obtain, manipulate or destroy data, such as personal data associated with users or the like. In another example, wrongdoers create and distribute malicious software (e.g., malware or the like) that include viruses, spyware and/or ransomware with the intent to comprise systems or data.

In large enterprises a high volume of software applications, otherwise referred to as computer programs, are used to perform tasks or functions. Such applications may be internally-generated or externally-generated (i.e., so-called third-party applications). Moreover, such software applications may be limited to internal use or may be specifically implemented externally (i.e., customer facing applications). In all instances, such applications are prone to security threats by cyber wrongdoers. Such security threats are heightened when vulnerabilities are introduced into the application (i.e., introduced into the underlying software code).

Security vulnerabilities in software are weaknesses or flaws in the computer program that can be capitalized on by malicious actors to compromise the security of the software, the device(s) on which the software/applications are being executed and/or the data being processed. Such vulnerabilities can be unintentional and result from coding errors, design flaws or other issues during software development. For example, security vulnerabilities may be unintentionally introduced as a result of loosely coupled coding, which is a design and programming approach in which components and modules of a software system are designed to interact with each other with minimal dependencies. To achieve loose coupling, developers use coding techniques such as encapsulation, abstraction and well-defined interfaces (e.g., Application Programming Interfaces (APIs)) to minimize the dependencies between components. However, such a loose coupling design approach results in software applications that include more vulnerabilities. As a result, the applications are more susceptible to wrongdoers gaining access to the applications or injecting malicious software into the applications.

Introduction of vulnerabilities into applications is not limited to those that result from coding errors, design flaws or other issues during software development. In this regard, security vulnerabilities may result from changes to the system or overall computing environment on which the application is running, such as changes to a operating system, changes to hardware or the like. Moreover, vulnerabilities may be introduced as a result of an attempted malicious attack on the application and/or associated computing environment.

Therefore, a need exists for systems, apparatus, methods and the like that will not only identify potential vulnerabilities in software applications, including security vulnerabilities, but also verify/confirm the potential vulnerabilities as actual vulnerabilities and automatically identify and implement the necessary remedial actions necessary to eliminate or at least mitigate the vulnerabilities. In this regard, the desired systems, apparatus, methods and the like should be capable of identifying and verifying/confirming vulnerabilities and identifying/implementing necessary remedial actions at the onset of the vulnerabilities introduction into the application, so as to prevent the vulnerabilities from being presented to malicious actors/wrongdoers.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program products and the like that provide an end-to-end approach for (i) identifying potential vulnerabilities in software applications, including security vulnerabilities, (ii) confirming the potential vulnerabilities as actual vulnerabilities and (iii) identifying the necessary remedial actions necessary to eliminate or at least mitigate the vulnerabilities. Specifically, the invention relies on an intelligent agent that is plugged into either an application development and deployment system or the software applications themselves. The agent is configured to detect a change in the software code or the application's computing environment and, as a result identify potential vulnerabilities, verify/confirm the potential vulnerabilities as actual vulnerabilities and automatically identify the necessary remedial actions necessary to eliminate or at least mitigate the vulnerabilities. Changes in the application's computing environment may include, but are not limited to, (i) check-in by a code developer of newly generated applications or modifications to existing applications at a code repository, (ii) introduction of the application into a new computing environment (e.g., (a) from the code repository to code testing environment, (b) from the testing environment to a production environment or the like), (iii) changes in the computing environment (e.g., changes to the operating system or other underlying software, changes in hardware or hardware configuration or the like), (iv) attempted or actual malicious attacks on the application and/or computing environment in which the application is running, or the like.

In response to the intelligent agent detecting a change to a software application's code or the application's computing environment, the agent will capture all known vulnerabilities from internal and external sites (e.g., Open Web Application Security Project (OWASP) and the like) and scan the application for potential vulnerabilities. Scanning of the application for potential vulnerabilities is conducted intelligently, using machine learning models or the like, which are trained on the results of previous scans of the application and/or other applications. Intelligent scanning ensures that known vulnerabilities are identified in the application of concern.

In response to identifying one or more vulnerabilities, the intelligent agent confirms/verifies the vulnerability as an actual vulnerability by determining and executing one or more vulnerability test cases/scenarios for each identified vulnerability. Determination of the vulnerability test cases/scenarios may include generating one or more vulnerability test cases/scenarios and/or retrieving a previously generated vulnerability test case/scenario from a repository. Each vulnerability test case/scenario is specific to a computing environment that the application is or will be deployed in and, therefore each identified vulnerability may result in multiple different vulnerability test cases/scenarios. The vulnerability test case/scenario serves to replicate the occurrence of the vulnerability in the specific computing environment.

In response to the vulnerability test case/scenario confirming the vulnerability as an actual vulnerability, the intelligent agent accesses a database that maps vulnerabilities to actions/policies to determine the actions and/or policies that require implementation to eliminate or mitigate (i.e., reduce but not fully eliminate) the vulnerability and, in response to determining the actions/policies, the actions/policies are included in reports to users of interest (e.g., developers who are tasked with resolving the vulnerability or the like).

In specific embodiments of the invention, in response to executing the vulnerability test cases and determining actions/policies, a security score, also referred to herein as a "reward" is calculated that indicates the current level of threat associated with the vulnerability. In specific embodiments of the invention, the security score is a baselined score, such that if the vulnerability can be eliminated a positive score is assigned and if the vulnerability can be partially mitigated or otherwise remains intact a negative score is assigned. Calculation of the security score may be determined based on a level of security importance assigned to the vulnerability.

In those embodiments of the invention in which the intelligent agent scan results in identifying multiple different vulnerabilities, each vulnerability is processed in sequence. Sequential processing provides for an initial identified vulnerability to undergo vulnerability test case/scenario determination and execution, and, if confirmed/verified, remedial actions/polices are identified and a security score calculated. Subsequently, a next identified vulnerability undergoes vulnerability test case/scenario determination and execution and, if confirmed verified, remedial actions/policies are identified and the security score is re-calculated, which reflects the dynamic health status of the application based on currently confirmed vulnerabilities (i.e., all identified vulnerabilities that have undergone vulnerability test case/scenario determination and execution). Continuous re-calculation of the security score allows users, such as code developers and the like to know the current security health status of the software application at any point-in-time, such as any time during which the software application's code is being developed/updated. Once the last vulnerability has undergone vulnerability test case determination and execution, a final security score is rendered that takes into account all of the identified vulnerabilities. In specific embodiments of the invention, the final security score is compared to a threshold security score to determine whether or not the software application can be deployed to a next level computing environment (e.g., from a development computing environment to a test computing environment, from a test computing environment to a production computing environment or the like) or continue to be deployed/executed in an existing computing environment.

A system for enterprise-wide detection and confirmation of security vulnerabilities in software applications defines first embodiments of the invention. The system includes a plurality of software applications including internally-generated software applications and third-party software applications acquired by the enterprise. Each software application comprising executable code. The system additionally includes an intelligent agent having one or more machine learning algorithms. The intelligent agent is in communication with (e.g., plugged-in to) the plurality of software applications. The intelligent agent is configured to implement at least one of the one or more machine learning algorithms to identify changes in (i) the code of a software application or (ii) a computing environment in which the software application is deployed. In response to identifying a change to the code or the computing environment, the intelligent agent is configured to poll one or more vulnerability data sources to retrieve listings of vulnerabilities and implement at least one of the one or more machine learning algorithms to scan the software application to identify one or more vulnerabilities from amongst the listings of vulnerabilities.

In response to the scan resulting in identification of one or more vulnerabilities, for each of the one or more vulnerabilities, the intelligent agent is configured to implement at least one of one or more machine learning algorithms to determine one or more vulnerability test cases for a corresponding vulnerability and execute the software application on the one or more vulnerability test cases to confirm or deny that the corresponding vulnerability poses a security threat to the software application and/or computing environment. Each vulnerability test case is configured to replicate the corresponding vulnerability in a specific computing environment in which the software application is or will be deployed in. In response to confirming that the corresponding vulnerability poses the security threat to the software application, the intelligent agent is further configured to (i) identify at least one of (a) a policy associated with the confirmed vulnerability, and (b) one or more actions required to eliminate or mitigate the confirmed vulnerability, and (ii) generate and communicate a report to one or more entities of concern (i.e., entities suited to address the confirmed vulnerability). The report includes results of the one or more vulnerability test cases and at least one of the identified policy and/or and the identified action(s).

In specific embodiments of the system, the intelligent agent is further configured to implement the at least one of one or more machine learning algorithms to determine the one or more vulnerability test cases for a corresponding vulnerability by determining whether a pre-existing vulnerability test case exists for the vulnerability and the specific computing environment, and, in response to determining that the pre-existing vulnerability test case does exist, executing the software application on the pre-existing vulnerability test or, in response to determining that the pre-existing vulnerability test case does not exist, generating/creating a vulnerability test case specific to the corresponding vulnerability and a specific computing environment in which the software application is or will be deployed in.

In further specific embodiments of the system, the intelligent agent is further configured to, in response to executing the software application on the one or more vulnerability test cases, calculate a security score for the software application that indicates a security health of the software application based at least on results of the one or more vulnerability test cases for the corresponding vulnerability. In related embodiments of the system, the intelligent agent calculates the security score based further on at least one of (a) the policy associated with the confirmed vulnerability, and (b) one or more actions required to eliminate or mitigate the confirmed vulnerability. In other related embodiments of the system, in which the scan results in identifying a plurality of vulnerabilities, the intelligent agent is further configured to, in response to sequentially executing the software application on the one or more vulnerability test cases for each of the plurality vulnerabilities, re-calculate the security score for the software application based at least on results of the one or more vulnerability test cases for each of the plurality of vulnerabilities having undergone vulnerability test case execution.

In further related specific embodiments of the system, the intelligent agent is further configured to, in response to executing the software application on the one or more vulnerability test cases for all of the plurality vulnerabilities, calculate a final security score for the software application based at least on results of the one or more vulnerability test cases for all of the plurality of vulnerabilities. In such embodiments of the system, the intelligent agent is further configured to compare the final security score to a threshold final security score to determine whether the security health of the software application warrants deployment to a next level computing environment or continued execution in a currently deployed computing environment.

In additional specific embodiments of the system, the machine learning algorithms include an on-policy reinforcement learning algorithm, such as a State Action Reward State Action (SARSA) algorithm. In additional specific embodiments of the system, the machine learning algorithms include a neural network.

Moreover, in other specific embodiments of the system, the intelligent agent is further configured to in response to detecting (i) or (ii), poll one or more vulnerability data sources to retrieve listings of vulnerabilities. The vulnerability data sources include at least one of Open Web Application Security Project (OWASP), one or more social media sites, and one or more internal data sources.

A computer-implemented method for enterprise-wide detection and confirmation of security vulnerabilities in software applications defines second embodiments of the invention. The method is executable by one or more computing processor devices. The method includes implementing at least one machine learning algorithm (embodied in an intelligent agent plugged into a software application) to identify changes in (i) the code of the software application or (ii) a computing environment in which the software application is deployed. In response to identifying a change in the code or the computing environment, the computer-implemented method further includes polling one or more vulnerability data sources to retrieve listings of vulnerabilities and implementing at least one machine learning algorithm embodied in the intelligent agent plugged into the software application to scan the software application to identify one or more vulnerabilities from amongst the listings of vulnerabilities.

In response to the scan resulting in identification of one or more vulnerabilities, for each of the one or more vulnerabilities, the computer-implemented method includes implementing at least one machine learning algorithm (embodied in the intelligent agent plugged into the software application) to determine one or more vulnerability test cases for a corresponding vulnerability and executing the software application on the one or more vulnerability test cases to confirm or deny that the corresponding vulnerability poses a security threat to the software application. Each vulnerability test case is configured to replicate the corresponding vulnerability in a specific computing environment in which the software application is or will be deployed in.

In response to confirming that the corresponding vulnerability poses the security threat to the software application, the computer-implemented method further includes identifying at least one of (a) a policy associated with the confirmed vulnerability, and (b) one or more actions required to eliminate or mitigate the confirmed vulnerability and generating and initiating communication of a report to one or more entities of concern. The report includes results of the one or more vulnerability test cases and at least one of the policy and/or the action(s).

In specific embodiments of the computer-implemented method, implementing the one or more machine learning algorithms to determine the one or more vulnerability test cases for a corresponding vulnerability further includes determining whether a pre-existing vulnerability test case exists for the vulnerability and the specific computing environment and, in response to determining that the pre-existing vulnerability test case does exist, executing the software application on the pre-existing vulnerability test, or, in response to determining that the pre-existing vulnerability test case does not exist, generating/creating a vulnerability test case specific to the corresponding vulnerability and a specific computing environment in which the software application is or will be deployed in.

In other specific embodiments the computer-implemented method further includes, in response to executing the software application on the one or more vulnerability test cases, calculating a security score for the software application that indicates a security health of the software application based at least on results of the one or more vulnerability test cases for the corresponding vulnerability and at least one of (a) the policy associated with the confirmed vulnerability, and (b) one or more actions required to eliminate or mitigate the confirmed vulnerability. In related embodiments of the computer-implemented method, in which the one or more vulnerabilities comprise a plurality of vulnerabilities, the method further includes, in response to sequentially executing the software application on the one or more vulnerability test cases for each of the plurality vulnerabilities, re-calculating the security score for the software application based at least on results of the one or more vulnerability test cases for each of the plurality of vulnerabilities having undergone vulnerability test case execution.

In other related embodiments the computer-implemented method further includes, in response to executing the software application on the one or more vulnerability test cases for all of the plurality vulnerabilities, calculating a final security score for the software application based at least on results of the one or more vulnerability test cases for all of the plurality of vulnerabilities and comparing the final security score to a threshold final security score to determine whether the security health of the software application warrants deployment to a next stage computing environment or continued execution in a currently deployed computing environment.

A computer program product including a non-transitory computer-readable medium defines third embodiments of the invention. The computer-readable medium includes sets of codes for causing computing device(s) to implement at least one machine learning algorithm embodied in an intelligent agent plugged into a software application to identify changes in (i) the code of the software application or (ii) a computing environment in which the software application is deployed. In response to identifying (i) or (ii), the set of codes cause the computing device(s) to poll one or more vulnerability data sources to retrieve listings of vulnerabilities and implement at least one machine learning algorithm (embodied in the intelligent agent plugged into the software application) to scan the software application to identify one or more vulnerabilities from amongst the listings of vulnerabilities.

In response to the scan resulting in identification of one or more vulnerabilities, for each of the one or more vulnerabilities, the sets of codes cause the computing device(s) to implement at least one machine learning algorithm (embodied in the intelligent agent plugged into the software application) to determine one or more vulnerability test cases for a corresponding vulnerability and execute the software application on the one or more vulnerability test cases to confirm or deny that the corresponding vulnerability poses a security threat to the software application. Each vulnerability test case is configured to replicate the corresponding vulnerability in a specific computing environment in which the software application is or will be deployed in.

In response to confirming that the corresponding vulnerability poses the security threat to the software application, the sets of codes cause the computing device(s) to identify at least one of (a) a policy associated with the confirmed vulnerability, and (b) one or more actions required to eliminate or mitigate the confirmed vulnerability and generate and initiate communication of a report to one or more entities suited to address the confirmed vulnerability. The report includes results of the one or more vulnerability test cases and at least one of the identified policy and/or the identified action(s).

In specific embodiments of the computer program product, the set of codes for causing the one or more computing devices to implement the one or more machine learning algorithms to determine the one or more vulnerability test cases for a corresponding vulnerability are further configured to cause the computing device(s) to determine whether a pre-existing vulnerability test case exists for the vulnerability and the specific computing environment, and in response to determining that the pre-existing vulnerability test case does exist, execute the software application on the pre-existing vulnerability test or in response to determining that the pre-existing vulnerability test case does not exist, generate a vulnerability test case specific to the corresponding vulnerability and a specific computing environment in which the software application is or will be deployed in.

In other specific embodiments of the computer program product, the sets of codes further comprise sets of codes configured to cause the one or more computing devices to, in response to executing the software application on the one or more vulnerability test cases, calculate a security score for the software application that indicates a security health of the software application based at least on results of the one or more vulnerability test cases for the corresponding vulnerability and at least one of (a) the policy associated with the confirmed vulnerability, and (b) one or more actions required to eliminate or mitigate the confirmed vulnerability.

In related specific embodiments of the computer program product, the one or more vulnerabilities comprise a plurality of vulnerabilities, and the sets of codes further comprise sets of codes configured to cause the one or more computing devices to, in response to sequentially executing the software application on the one or more vulnerability test cases for each of the plurality vulnerabilities, re-calculate the security score for the software application based at least on results of the one or more vulnerability test cases for each of the plurality of vulnerabilities having undergone vulnerability test case execution. In further related embodiments of the computer program product, the sets of codes further comprise sets of codes configured to cause the one or more computing devices to, in response to executing the software application on the one or more vulnerability test cases for all of the plurality vulnerabilities, calculating a final security score for the software application based at least on results of the one or more vulnerability test cases for all of the plurality of vulnerabilities and compare the final security score to a threshold final security score to determine whether the security health of the software application warrants deployment to a next stage computing environment or continued execution in a currently deployed computing environment.

Thus, according to embodiments of the invention, which will be discussed in greater detail below, the present invention provides for an end-to-end approach for (i) identifying potential vulnerabilities in software applications, including security vulnerabilities, (ii) verifying/confirming the potential vulnerabilities as actual vulnerabilities, and (iii) in response, identifying the necessary remedial actions necessary to eliminate or at least mitigate the vulnerabilities. Specifically, the invention relies on an intelligent agent that is plugged-in to an application development and deployment system or the applications and is configured to detect a change to the application's code or computing environment and, as a result of detection of changes to the code or computing environment, identify potential vulnerabilities, verify/confirm the potential vulnerabilities as actual vulnerabilities through determination/creation and execution of tests cases and automatically identify the necessary remedial actions necessary to eliminate or at least mitigate the vulnerabilities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
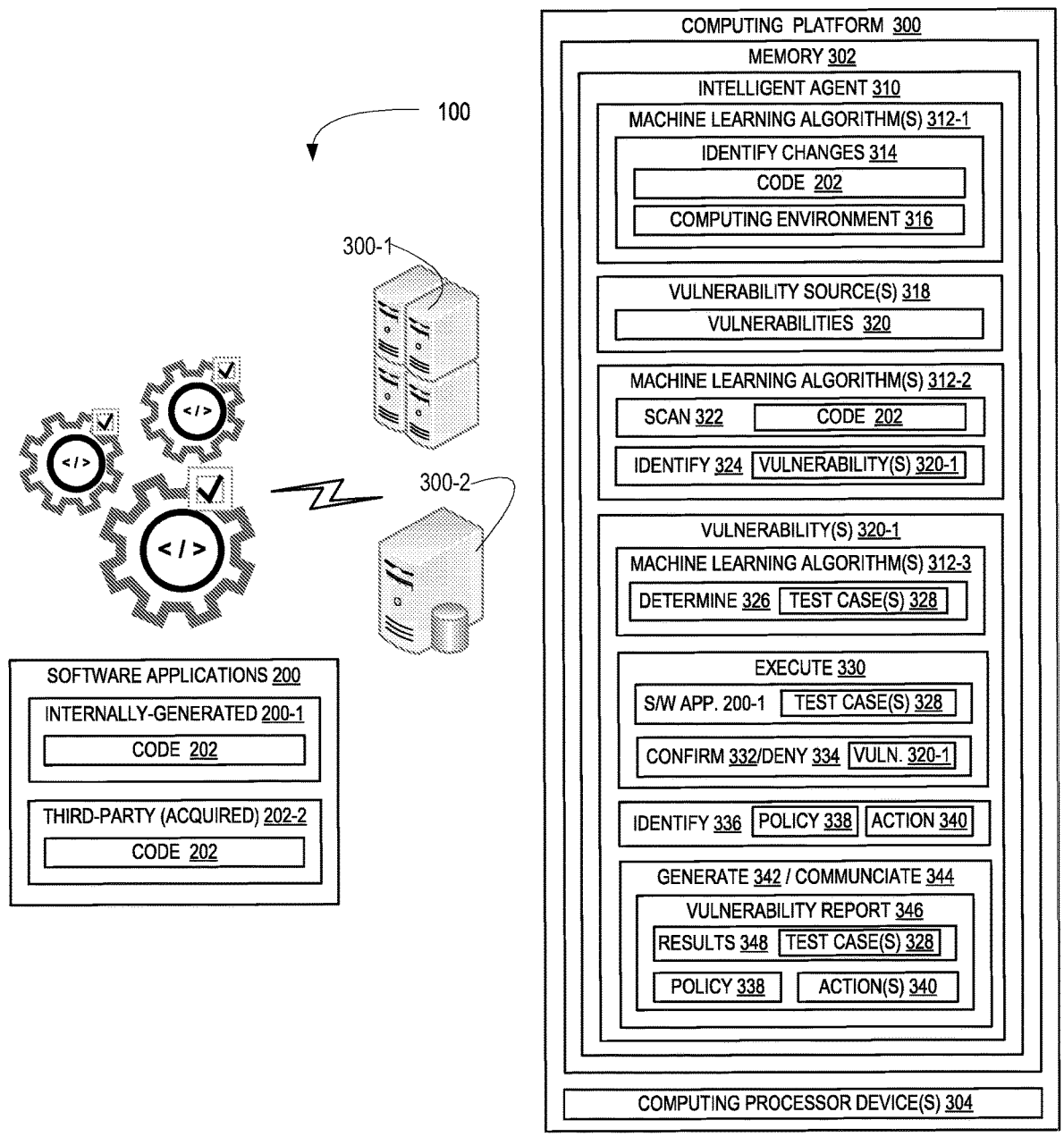
Figure 2:
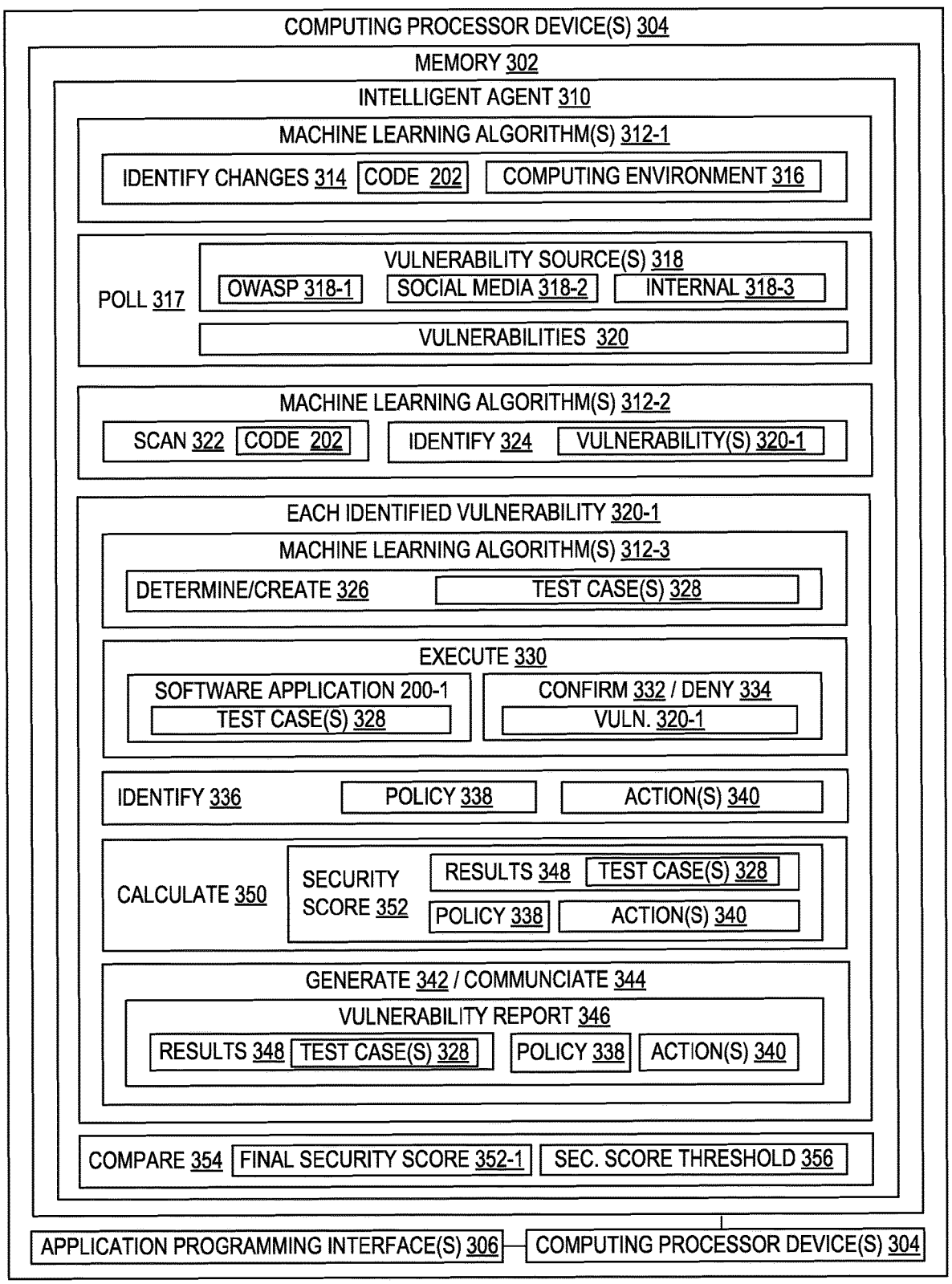
Figure 3:
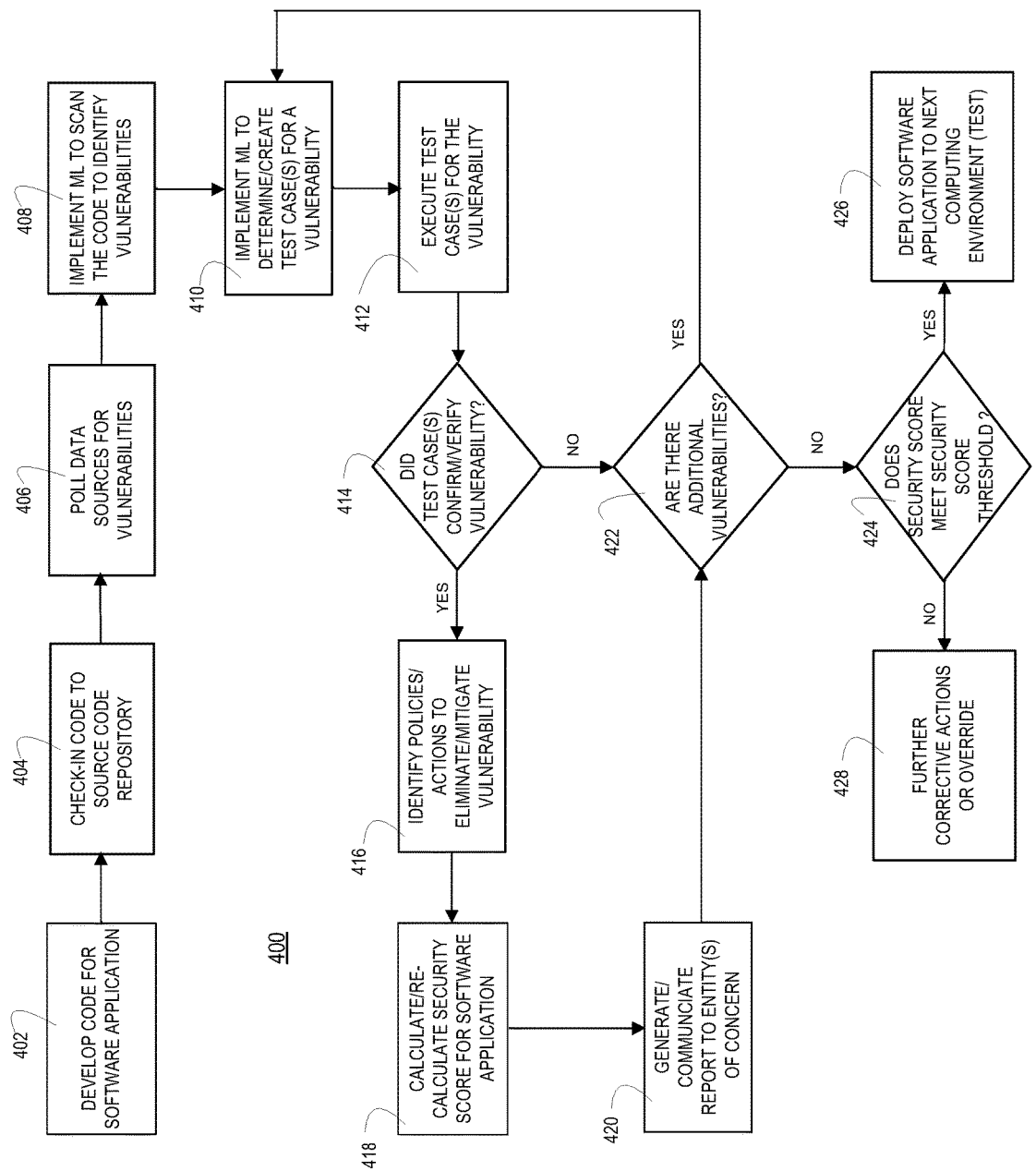
Figure 4:
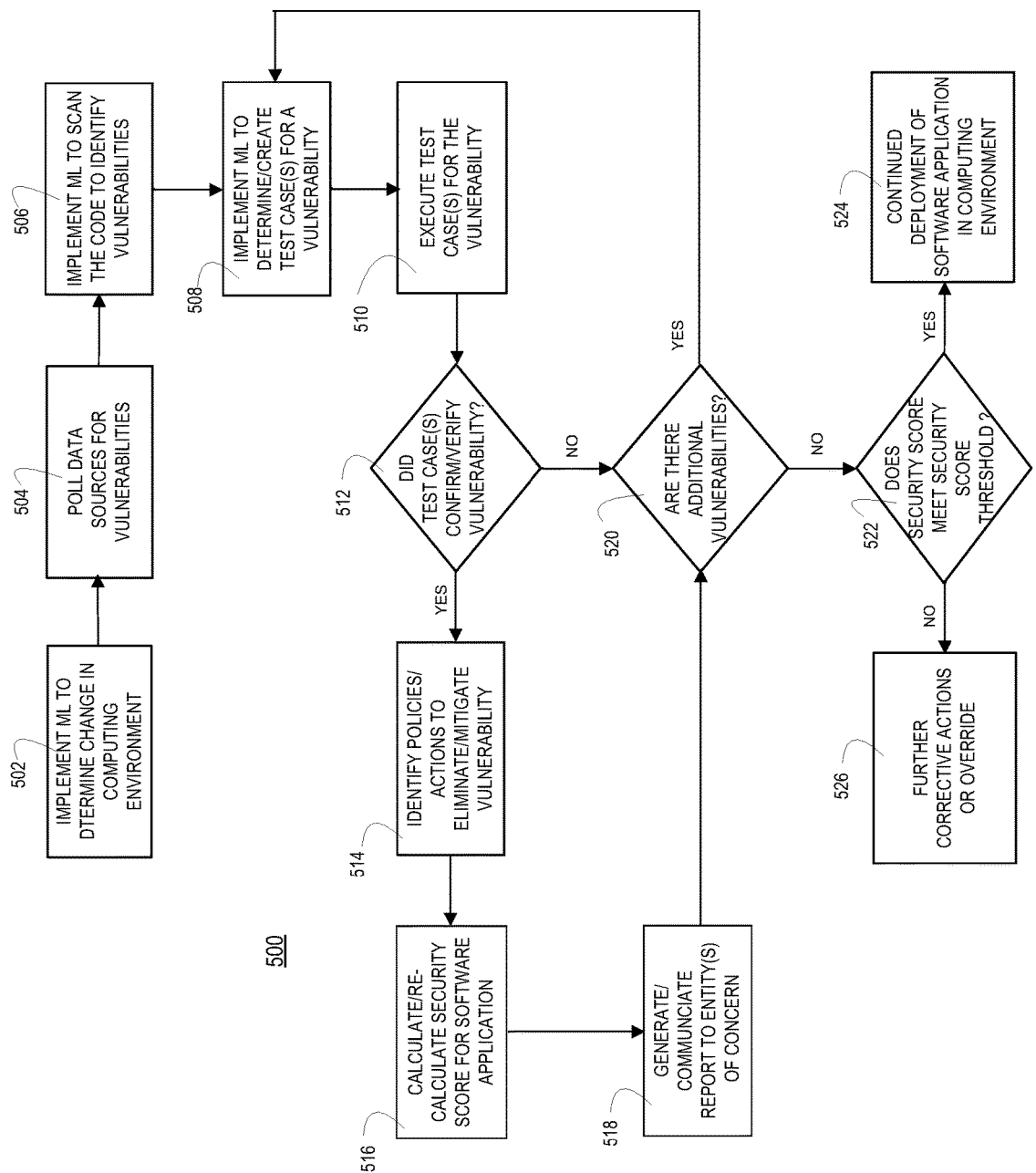
Figure 5:
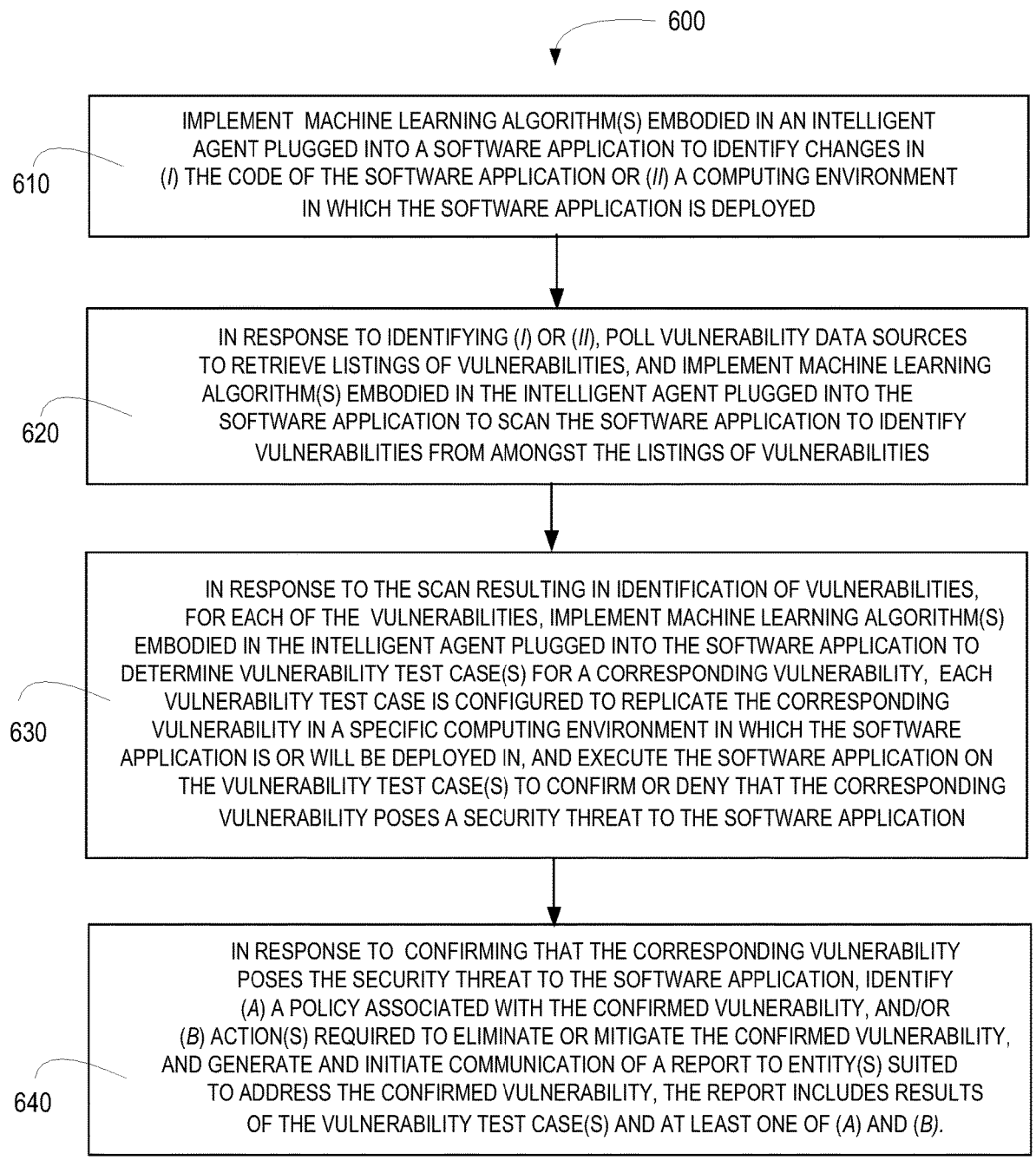
Figure 6:
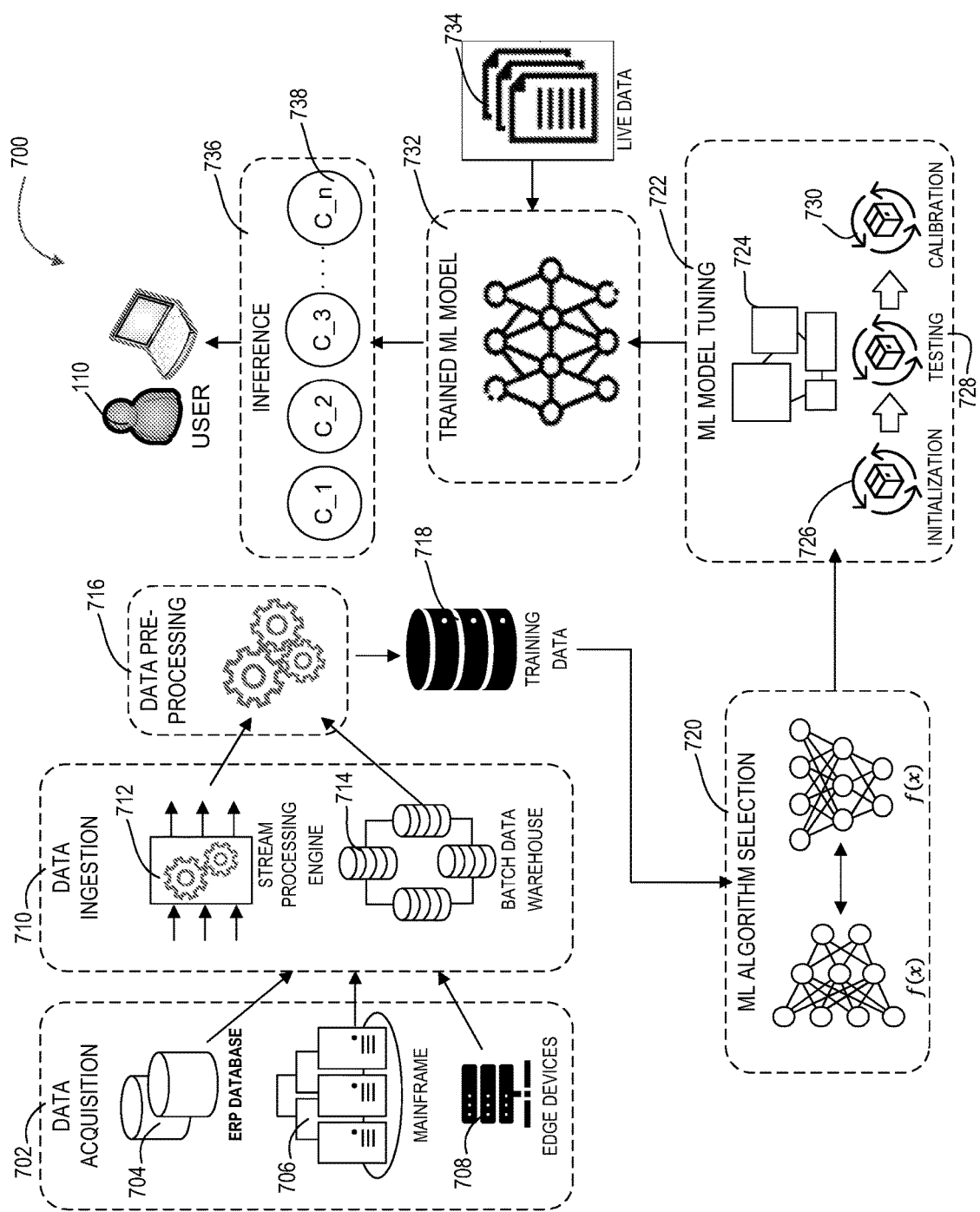

Having thus described embodiments of the disclosure in general terms, reference will now be made to the accompanying drawings, wherein:

FIG. 1 is a schematic/block diagram of a system for intelligent detection and confirmation of vulnerabilities in software applications, in accordance with embodiments of the present invention;

FIG. 2 is a schematic/block diagram of a computing platform including an intelligent agent for detecting and confirming vulnerabilities introduced into software applications, in accordance with embodiments of the present invention;

FIG. 3 is a flow diagram of a method for intelligent detection and confirmation of security vulnerabilities introduced into a software application as a result of code development, in accordance with embodiments of the present invention;

FIG. 4 is a flow diagram of a method for intelligent detection and confirmation of security vulnerabilities introduced into a software application as a result of changes to the computing environment in which the software application is deployed, in accordance with embodiments of the present invention;

FIG. 5 is a flow diagram of an intelligent method for detection and confirmation of security vulnerabilities introduced into a software application, in accordance with embodiments of the present invention; and FIG. 6 is a schematic/flow diagram of an exemplary machine learning (ML) subsystem architecture, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide an end-to-end approach for (i) identifying potential vulnerabilities in software applications, including security vulnerabilities, (ii) verifying/confirming the potential vulnerabilities as actual vulnerabilities that pose threats to the software application and/or computing environment and (iii) identifying the necessary remedial actions necessary to eliminate or at least mitigate the vulnerabilities. Specifically, the invention relies on an intelligent agent that is plugged into either an application development and deployment system or the applications themselves. The agent is configured to detect a change in the software code or the application's computing environment and, as a result identify potential vulnerabilities, verify/confirm the potential vulnerabilities as actual vulnerabilities and automatically identify the necessary remedial actions necessary to eliminate or at least mitigate the vulnerabilities. Changes in the application's computing environment may include, but are not limited to, (i) check-in by a code developer of newly generated applications or modifications to existing applications at a code repository, (ii) introduction of the application into a new computing environment (e.g., (a) from the code repository to code testing environment, (b) from the testing environment to a production environment or the like), (iii) changes in the computing environment (e.g., changes to the operating system or other underlying software, changes in hardware or hardware configuration or the like), (iv) attempted or actual malicious attacks on the application and/or computing environment in which the application is running, or the like.

In response to the intelligent agent detecting a change to application's code or the application's computing environment, the agent will capture all known vulnerabilities from internal and external sites (e.g., Open Web Application Security Project (OWASP) and the like) and scan the application for potential vulnerabilities. Scanning of the application for potential vulnerabilities is conducted intelligently, using machine learning models or the like, which are trained on the results of previous scans of the application and/or other applications. Intelligent scanning ensures that known vulnerabilities are properly identified in the application of concern.

In response to identifying one or more vulnerabilities, the intelligent agent confirms/verifies the vulnerability as an actual vulnerability by determining and executing one or more vulnerability test cases/scenarios for each identified vulnerability. Determination of the vulnerability test cases/scenarios may include generating one or more vulnerability test cases/scenarios and/or retrieving a previously generated vulnerability test case/scenario from a repository. Each vulnerability test case/scenario is specific to a computing environment that the application is or will be deployed in and, therefore each identified vulnerability may result in multiple different vulnerability test cases/scenarios. The vulnerability test case/scenario serves to replicate the occurrence vulnerability in the specific computing environment.

In response to the vulnerability test case/scenario confirming the vulnerability as an actual vulnerability, the intelligent agent accesses a database that maps vulnerabilities to actions/policies to determine the actions and/or policies that require implementation to eliminate or mitigate (i.e., reduce but not fully eliminate) the vulnerability and, in response to determining the actions/policies, the actions/policies are included in reports to users of interest (e.g., developers who are tasked with resolving the vulnerability).

In specific embodiments of the invention, in response to executing the vulnerability test cases and determining actions/policies, a security score, also referred to herein as a "reward" is calculated that indicates the current level of threat associated with the vulnerability. In specific embodiments of the invention, the security score is a baselined score, such that if the vulnerability can be eliminated a positive score is added to the baseline or existing security score and if the vulnerability can be partially mitigated or otherwise remains intact a negative score is subtracted from the baseline or existing security score. Calculation of the security score may be determined based on a level of security importance assigned to the vulnerability (i.e., a weighting factor assigned based on the level security importance).

In those embodiments of the invention in which the intelligent agent scan results in identifying multiple different vulnerabilities, each vulnerability is processed in sequence. Sequential processing provides for an initial identified vulnerability to undergo vulnerability test case/scenario determination and execution, and, if confirmed/verified, remedial actions/polices are identified and a security score calculated. Subsequently, a next identified vulnerability undergoes vulnerability test case/scenario determination and execution and, if confirmed verified, remedial actions/policies are identified and the security score is re-calculated, which reflects the health status of the application based on currently confirmed vulnerabilities (i.e., all identified vulnerabilities that have undergone vulnerability test case/scenario determination and execution). Re-calculation of the security score allows users, such as code developers and the like to dynamically know the current security health status of the software application, such as at any time during which the software application's code is being developed/updated. Once the last vulnerability has undergone vulnerability test case determination and execution, a final security score is calculated that takes into account all of the identified vulnerabilities. In specific embodiments of the invention, the final security score is compared to a threshold security score to determine whether or not the software application can be deployed to a next level computing environment (e.g., from a development computing environment to a test computing environment, from a test computing environment to a production computing environment or the like) or continue to be deployed/executed in an existing computing environment.

Referring to FIG. 1, a schematic/block diagram is presented of a system 100 for enterprise-wide detection and confirmation of security vulnerabilities in software applications, in accordance with embodiments of the invention. A security vulnerability, as used herein, is any weakness or flaw in the software application that can be capitalized on by malicious actors to compromise the security of the software application, the data being processed by the software application and/or the system/computing environment in which the software application is being executed. The vulnerabilities may result from loosely coupled development standards, development/design flaws, misconfigurations and the like. The system 100 includes a plurality of software applications 200, typically, all of an enterprise's software applications including both internally generated software applications 200-1 and third-party software applications 200-2 acquired by or otherwise used by the enterprise. Each of the software applications 200 include executable computer code 202 which serves as programmable instructions for completing an automated task or function.

The system 100 additionally includes a computing platform 300, which may comprise an application server(s) 300-1, a database server 300-2 or the like having a memory 302 and one or more computing processor devices 304 in communication with memory 302. Memory 302 stores intelligent agent 310 that is, in specific embodiments of the system, is in communication with (commonly referred to as "plugged-in" to) each of the plurality of software applications 200. In other embodiments of the system, intelligent agent 310 is in communication with/plugged-in to a system for managing the development and/or deployment of software applications, such that the intelligent agent is configured for execution on the software applications as they are managed by the system. Intelligent agent 310 implements a plurality of machine learning algorithms/techniques 312 for purposes of triggering execution of the agent, detecting vulnerabilities and confirming/verifying that the vulnerabilities pose a security threat to the software application in the deployed computing environments.

Specifically, intelligent agent 310 is configured to implement machine learning algorithms 312-1 to identify changes 314 in (i) the code 202 of the software application 200 and (ii) the computing environment 316 in which the software application 200 is deployed.

Identifying changes 314 to the code 202 may include both intentional or unintentional changes to the code 202. For example, intentional changes to code 202 are made by code/software application developers who may be generating a new software application or making updates/revisions to an existing software application. Thus, changes to the code 202 may be identified in response to a code developer checking-in code to a source code repository or some other unified code repository. Unintentional changes to the code 202 may be identified/detected from code 202 that has been deployed to a test or production computing environment or the like and may be made unintentionally by an authorized user or wrongfully by a malicious actor. Machine learning algorithms 312-1 rely on previous instances of changes to the code 202 within the software application 200 or, in some instances, changes in the code 200 within other software applications to determine the specific portions of the code 2020 that have been changed (i.e., changes being checked-in to the source code repository and/or the unintentional/wrongful changes).

Identifying changes 314 to the computing environment 316 may include movement/deployment of the software application from one computing environment to another (e.g., from the source code repository to a test computing environment, from the test computing environment to a production computing environment and the like). In addition, changes to the computing environment 316 may include changes to hardware and/or software in the computing environment in which the software application 200 is currently deployed. For example, a software change to the computing environment 316 may include, but is not limited to, a patch/update to an underlying software application, such as an operating system or an upstream/downstream software application. In addition, other changes to the computing environment 316, such as changes to access and/or control of the software application and/or changes to how processed data is backed-up or recovered may constitute a change in computing environment 316.

In response to identifying a change in either (i) the code 202 of the software application 200 or (ii) the computing environment 316 in which the software application 200 is deployed, intelligent agent 310, is configured to poll one or more vulnerability data sources 318 for listings of known, current vulnerabilities 320, and, in some embodiments the actions (e.g., patches/fixes or the like) that need to be taken to address (e.g., eliminate or mitigate) the vulnerability. In response to receiving the listing of vulnerabilities 320 from the polled vulnerability data source(s) 318, intelligent agent 310 is configured to implement machine learning algorithms 312-2 to scan 322 the code 202 of the software application 300 to identify 324 vulnerabilities 320-1 in the code 202 from amongst the vulnerabilities 320 in the listing(s). In this regard, the identification of change to either (i) the code 202 or (ii) the computing environment 316 serves as the trigger for scanning 322 the code 202 of the software application 200 to determine if vulnerabilities 320-1 have been introduced as a result of the detected/identified change 314. It should be noted that in other embodiments of the invention, the intelligent agent 310 may be triggered by a user, such that, vulnerability scans 322 are performed on an on-demand basis and the bequest of a user.

In response to the scan 322 resulting in identification of one or more vulnerabilities 320-1 and for each of the one or more vulnerabilities 320, the intelligent agent 310 is configured to implement machine learning algorithms 312-3 to determine 326 one or more test cases/scenarios 328 for a corresponding specific vulnerability 320-1. Each vulnerability test case 328 that is determined is specific to a computing environment 316 in which the software application 200 is or will be deployed in. Thus, if the software application 300 is or will be deployed in multiple different computing environments 316 a corresponding number of vulnerability test cases 328 may be determined. In response to determining the vulnerability test cases 328, intelligent agent 310 is configured to execute 330 the software application 200 on each of the vulnerability test cases 328 to confirm 332 or deny 334 that the corresponding vulnerability 320-1 poses a security threat to the software application 200 and/or the corresponding computing environment 316.

In response to confirming that the vulnerability 320-1 poses a security threat to the software application 200 and/or computing environment 316, intelligent agent 314 is configured to identify 336 at least one of (i) a policy 338 associated with the confirmed vulnerability 320-1 or (ii) action(s) 340 that need to be taken to address (i.e., eliminate or mitigate) the confirmed vulnerability 320-1. In response to identifying the (i) the policy 338 and/or (ii) the action(s), intelligent agent 346 is configured to generate 342 and initiate communication 344 of a vulnerability report to one or more entities of concern. The vulnerability report 346 includes, but is not limited to, identification of the vulnerability 320-1, results of the vulnerability test case(s) 328 and at least one of the (i) the policy 338 associated with the vulnerability 320-1 and the (ii) the actions 340 that need to be taken to eliminate or mitigate the vulnerability 320-1. In instances in which the vulnerability 320-1 resulted from newly developed code or changes to existing code, report 346 may be communicated to the developer who developed the code/changes and, in some instances, other developers who are simultaneously developing the code/changes.

Referring to FIG. 2, a block diagram is presented of computing platform 300 including intelligent agent 310, in accordance with embodiments of the present invention. In addition to providing greater details of intelligent agent 310, FIG. 2 highlights various alternate embodiments of the invention. Computing platform 300 may comprise one or, typically, multiple devices, such as application servers, database servers or the like. As previously discussed, computing platform 300 includes memory 302, which may comprise volatile and/or non-volatile memory, such as read-only memory (ROM) and/or random-access memory (RAM), EPROM, EEPROM, flash cards, or any memory common to computing platforms. Moreover, memory 302 may comprise cloud storage, such as provided by a cloud storage service and/or a cloud connection service.

Further, computing platform 300 includes one or more computing processing devices 304, which may be an application-specific integrated circuit ("ASIC"), or other chipset, logic circuit, or other data processing device. Computing processing device(s) 304 may execute one or more application programming interface (APIs) 306 that interface with any resident programs, such as intelligent agent 310 or the like, stored in memory 302 of computing platform 30 and any external programs. Computing platform 300 may include various processing subsystems (not shown in FIG. 2) embodied in hardware, firmware, software, and combinations thereof, that enable the functionality of computing platform 300 and the operability of computing platform 300 on a distributed communication network (not shown in FIG. 2), such as the Internet, intranet(s), cellular network(s) and the like. For example, processing subsystems allow for initiating and maintaining communications and exchanging data with other networked devices. For the disclosed aspects, processing subsystems of computing platform 300 may include any subsystem used in conjunction with intelligent agent 310 and related tools, routines, sub-routines, applications, sub-applications, sub-modules thereof.

In specific embodiments of the present invention, computing platform 300 additionally includes a communications module (not shown in FIG. 2) embodied in hardware, firmware, software, and combinations thereof, that enables electronic communications between components of computing platform 300 and other networks and network devices. Thus, communication module may include the requisite hardware, firmware, software and/or combinations thereof for establishing and maintaining a network communication connection with one or more devices and/or networks.

As previously discussed in relation to FIG. 1, memory 302 stores intelligent agent 310 that is configured to intelligently identify events, such as changes to code or computing environment that trigger intelligent scanning of software applications for purposes of vulnerability detection and, in response to detection, determine and execute vulnerability test cases that serve to replicate the vulnerability in specific computing environments for purposes of confirming a security threat posed by the vulnerability, in accordance with embodiments of the present invention.

Intelligent agent 310 is configured to implement machine learning algorithms 312-1 to identify changes 314 in (i) the code 202 of the software application 200 and (ii) the computing environment 316 in which the software application 200 is deployed. As previously discussed, identifying changes 314 to the code 202 may include both intentional or unintentional changes to the code 202. Identifying changes 314 to the computing environment 316 may include movement/deployment of the software application from one computing environment to another and changes to hardware and/or software in the computing environment in which the software application 200 is currently deployed. Machine learning models are used that are trained on previously determined changes in code and/or computing environment to recognize current instances of changes in code and/or computing environment.

In response to identifying a change 314 in either (i) the code 202 of the software application 200 or (ii) the computing environment 316 in which the software application 200 is deployed, intelligent agent 310, is configured to poll 317 one or more vulnerability data sources 318 for listings of known, current vulnerabilities 320, and, in some embodiments the actions (e.g., patches/fixes or the like) that need to be taken to address (e.g., eliminate or mitigate) the vulnerability. Vulnerability data sources 318 may include, but are not limited to, Open Web Application Security Project (OWASP) 318-1, social media sites 318-2, internal vulnerability data sources 318-3 and the like.

In response to receiving the listing of vulnerabilities 320 from the polled vulnerability data source(s) 318, intelligent agent 310 is configured to implement machine learning algorithms 312-2 to scan 322 the code 202 of the software application 300 to identify 324 vulnerabilities 320-1 in the code 202 from amongst the vulnerabilities 320 in the listing (s). In this regard, the identification of change to either (i) the code 202 or (ii) the computing environment 316 serves as the trigger for scanning 322 the code 202 of the software application 200 to determine if vulnerabilities 320-1 have been introduced as a result of the detected/identified change 314. Machine learning algorithms 312-2 may include on-policy reinforcement learning algorithms, such as State-Action-Reward-State-Action (SARSA) or the like, which are trained to recognize vulnerabilities based on previous scans of the software application and/or other software application(s).

In response to the scan 322 resulting in identification of one or more vulnerabilities 320-1 and for each of the one or more vulnerabilities 320, the intelligent agent 310 is configured to implement machine learning algorithms 312-3 to determine 326 one or more test cases/scenarios 328 for a corresponding specific vulnerability 320-1. Each vulnerability test case 328 that is determined is specific to a computing environment 316 in which the software application 200 is or will be deployed in. Thus, if the software application 300 is or will be deployed in multiple different computing environments 316 a corresponding number of vulnerability test cases 328 may be determined.

In specific embodiments of the invention, determining 326 a test case/scenario 328 comprises creating/generating a test case for a specific vulnerability and specific computing environment. In such instances, machine learning algorithms trained on previously generated test cases/scenarios for the software application or other software applications are used to generate/create a current test case(s)/scenario(s) for the specific vulnerability and computing environment(s). In one specific embodiment of the invention, determining 326 a test case scenario 328 includes accessing a vulnerability test case database to determine if a match(es) exists between a pre-existing test cases/scenarios 328 and the (i) vulnerability and (ii) computing environment(s). If a determination is made that a pre-existing test case/scenario 318 is a match for the vulnerability and a specified computing environment, the pre-existing test case/scenario is used as the test case/scenario 328 for the vulnerability. However, if a determination is made that a pre-existing test case/scenario 318 does not match the vulnerability and the specified computing environment, a test case/scenario 328 is created/generated for the vulnerability and the specified computing environment in which the software application 200 is or will be deployed in.

In response to determining/creating 326 the vulnerability test cases 328, intelligent agent 310 is configured to execute 330 the software application 200 on each of the vulnerability test cases 328 to confirm 332 or deny 334 that the corresponding vulnerability 320-1 poses a security threat to the software application 200 and/or the corresponding computing environment 316.

In response to confirming that the vulnerability 320-1 poses a security threat to the software application 200 and/or computing environment 316, intelligent agent 314 is configured to identify 336 at least one of (i) a policy 338 associated with the confirmed vulnerability 320-1 or (ii) action(s) 340 that need to be taken to address (i.e., eliminate or mitigate) the confirmed vulnerability 320-1.

In specific embodiments of the system, in response to executing 330 the test cases/scenarios 328, intelligent agent 310 is configured to calculate a security score (otherwise referred to as a reward) based at least on the results on the test case(s)/scenario(s) and, in some embodiments, the identified 336 policy 338 associated with the vulnerability 320-1 and/or action(s) 340 required to eliminate or mitigate the vulnerability 320-1. In specific embodiments of the invention the security score is calculated from a baseline score, such as zero or the like, and positive values are added to the security score if the vulnerability 320-1 is capable of being eliminated and negative values are subjected from the security score if the vulnerability 320-1 is capable of only being mitigated or, in some instances, must be maintained. It should be noted that in those instances in which a scan 322 results in multiple vulnerabilities 320-1, each vulnerability 320-1 is sequentially subjected to test case/scenario 328 determination and execution and, as a result, the security score is continually re-calculated (i.e., updated) to reflect the results of the execution of the last-in-time test case/scenario 328 (i.e., processing of the last-in-time vulnerability 320-1). Such-recalculation of the security score continues until detected vulnerabilities 320-1 have undergone test case/scenario determination and execution.

In specific embodiments of the invention, once all of the identified vulnerabilities 320-1 have undergone vulnerability test case 328 determination and execution, the final security score 352-1 is calculated and compared 354 to a security score threshold 356 to determine whether the security health of the software application 200 warrants deployment to a next stage/level computing environment (e.g., source code repository to test computing environment, test computing environment to production computing environment or the like) or continued execution in a currently deployed computing environment. If the final security score 352-1 is determined to fall below or not meet the security score threshold 356, the software application may be relegated to further corrective action(s) including further re-work of the coding or the like.

In response to identifying the (i) the policy 338 and/or (ii) the action(s), intelligent agent 346 is configured to generate 342 and initiate communication 344 of a vulnerability report to one or more entities of concern. The vulnerability report 346 includes the vulnerability 320-1, results of the vulnerability test case(s) 328 and at least one of the (i) the policy 338 associated with the vulnerability 320-1 and the (ii) the actions 340 that need to be taken to eliminate or mitigate the vulnerability 320-1. In further embodiments of the invention, report 346 includes the current security score 352 for the software application 200 and an indication of the vulnerability's impact on the security score 352. In instances in which the vulnerability 320-1 resulted from newly developed code or changes to existing code, report 346 may be communicated to the developer who developed the code/changes and, in some instances, other developers who may be simultaneously developing the code/changes.

Referring to FIG. 3 a flow diagram is depicted of a method 400 for intelligent detection and confirmation of security vulnerabilities introduced into a software application as a result of code development, in accordance with embodiments of the present invention. At Event 402, code is developed for a software application by a code developer. The code that is being developed may be the initial code for a new software application being developed or updates/revisions to the code of an existing software application. Once the developer has completed code development (e.g., completed a code development session or the like), at Event 404, the code is checked-in to a source code repository. As previously discussed, the intelligent agent of the present invention, which is plugged-in to at least one of the software application and/or a code development and deployment system (e.g., Continuous Improvement Continuous Deployment (CI/CD) pipeline system), is configured to identify/detect that the code has been checked-in to the source repository (i.e., identify that the code of the software application has changed).

Thus, the checking-in of the code at the source code repository triggers, at Event 406, (i) the polling of vulnerability data source for current known vulnerabilities and, at Event 408, (ii) implementing machine learning algorithms (e.g., SARSA reinforcement learning algorithms or the like) to identify vulnerabilities from among the current known vulnerabilities. In this regard, the intelligent agent relies on machine learning algorithms trained on the results of previous scans performed on the software application and, in some instances, previous scans performed on other similar software applications.

In response to the scan resulting in the identification/detection of one or more vulnerabilities, at Event 410, machine learning algorithms are implemented to determine/create vulnerability test case(s) for each of the vulnerabilities. In specific embodiments of the invention, determination of the vulnerability test cases may include accessing a test case database to determine, using machine learning models or the like, if any pre-existing vulnerability test cases (i.e., vulnerability tests cases previously created for the vulnerability) match the vulnerability and one or more of the specific computing environment(s). If a determination is made that a match can be made between the pre-existing vulnerability test cases and the vulnerability/computing environment, the pre-existing vulnerability test case is selected as the vulnerability test case for the currently identified vulnerability. If a determination is made that a match can not be made between the pre-existing vulnerability test cases and the vulnerability/computing environment, a new vulnerability test case(s) is/are generated/created for the vulnerability and the specific computing environment(s). Once the vulnerability test case(s) have been determined/created, at Event 412, the vulnerability test cases are executed on the software application to confirm or deny that the corresponding vulnerability poses a security threat in the corresponding computing environment.

Based on the results of the vulnerability test case(s), at Decision 414, a determination is made as to whether the vulnerability has been confirmed/verified. If the vulnerability has been confirmed/verified, at Event 416, (i) policies associated with the vulnerability and/or (ii) actions required to address the vulnerability are identified. The policies and/or actions may be stored in an internal database which maps vulnerabilities to policies and/or actions. At Event 418, a security score is calculated for the software application based on the results of the vulnerability test case(s) and, in some instances, the policies and/or actions. In specific embodiments of the degree to which the vulnerability poses a threat to the software is also used as a weighting factor in calculating the security score. As previously discussed, the security score may be initialized from a baseline security score in which certain vulnerability (e.g., vulnerabilities which can be eliminated) result in the security score being increased, while other vulnerabilities (e.g., vulnerabilities which can only be mitigated or must be maintained) result in the security score being decreased.

At Event 420, a security report is generated and communicated to entities of concern (e.g., code developer(s)) that includes identification of the vulnerability, results of the vulnerability test case(s) and the policy and/or actions related to the vulnerability.

In response to the test case(s) failing to confirm/verify the vulnerability or further processing of a confirmed/verified vulnerability, at Decision 422, a determination is made as to whether additional vulnerabilities identified during the scan require vulnerability test case determination and execution. If a determination is made that additional vulnerabilities require vulnerability test case determination and execution, at Event 410, test case(s) are determined for the additional vulnerability and, at Event 412, the tests case(s) are executed. If the tests case(s) confirm/verify the additional vulnerability, at Event 416, the policies and/or actions are identified, at Event 418, the security score is recalculated/updated and, at Event 420, a security report is generated and communicated to parties of concern. Events 410-420 occur iteratively until all vulnerabilities identified in the scan have undergone vulnerability test case determination and execution.

If a determination is made that no further vulnerabilities require vulnerability test case determination and execution, at Decision 424, a determination is made as to whether the security score (i.e., the final security score) meets the security score threshold. If a determination is made that the security score meets the security score threshold, at Event 426, the code changes are accepted and/or the software application is authorized to be deployed to a next computing environment, such as a test computing environment. If a determination is made that the security score does not meet the security score threshold, at Event 428, further corrective actions are required/taken to address (e.g., overcome or override) the vulnerability(s).

Referring to FIG. 4 a flow diagram is depicted of a method for intelligent detection and confirmation of security vulnerabilities introduced into a software application as a result of changes to the computing environment in which the software application is deployed, in accordance with embodiments of the present invention. At Event 502, a change in computing environment is determined. In specific embodiments, the change is computing environment is determined using machine learning algorithms. A change in computing environment may include, but is not limited to, deployment of the software application from one computing environment to another (e.g., from a source code repository to a test computing environment) and changes within the computing environment in which the software application is deployed (e.g., patches/updates to the operating system, changes in hardware, changes to dependent software applications or the like).

Thus, the changes to the computing environment triggers, at Event 504, (i) the polling of vulnerability data source for current known vulnerabilities and, at Event 506, (ii) implementing machine learning algorithms (e.g., SARSA reinforcement learning algorithms or the like) to identify vulnerabilities from among the current known vulnerabilities. In this regard, the intelligent agent relies on machine learning algorithms trained on the results of previous scans performed on the software application and, in some instances, previous scans performed on other similar software applications.

In response to the scan resulting in the identification/detection of one or more vulnerabilities, at Event 508, machine learning algorithms are implemented to determine/create vulnerability test case(s) for each of the vulnerabilities. In specific embodiments of the invention, determination of the vulnerability test cases may include accessing a test case database to determine, using machine learning models or the like, if any pre-existing vulnerability test cases (i.e., vulnerability tests cases previously created for the vulnerability) match the vulnerability and one or more of the specific computing environment(s). If a determination is made that a match can be made between the pre-existing vulnerability test cases and the vulnerability/computing environment, the pre-existing vulnerability test case is selected as the vulnerability test case for the currently identified vulnerability. If a determination is made that a match can not be made between the pre-existing vulnerability test cases and the vulnerability/computing environment, a new vulnerability test case(s) is/are generated/created for the vulnerability and the specific computing environment(s). Once the vulnerability test case(s) have been determined/created, at Event 510, the vulnerability test cases are executed on the software application to confirm or deny that the corresponding vulnerability poses a security threat in the corresponding computing environment.

Based on the results of the vulnerability test case(s), at Decision 512, a determination is made as to whether the vulnerability has been confirmed/verified. If the vulnerability has been confirmed/verified, at Event 514, (i) policies associated with the vulnerability and/or (ii) actions required to address the vulnerability are identified. The policies and/or actions may be stored in an internal database which maps vulnerabilities to policies and/or actions. At Event 516, a security score is calculated for the software application based on the results of the vulnerability test case(s) and, in some instances, the policies and/or actions. In specific embodiments of the degree to which the vulnerability poses a threat to the software is also used as a weighting factor in calculating the security score. As previously discussed, the security score may be initialized from a baseline security score in which certain vulnerability (e.g., vulnerabilities which can be eliminated) result in the security score being increased, while other vulnerabilities (e.g., vulnerabilities which can only be mitigated or must be maintained) result in the security score being decreased.

At Event 518, a security report is generated and communicated to entities of concern (e.g., code developer(s)) that includes identification of the vulnerability, results of the vulnerability test case(s) and the policy and/or actions related to the vulnerability.

In response to the test case(s) failing to confirm/verify the vulnerability or further processing of a confirmed/verified vulnerability, at Decision 520, a determination is made as to whether additional vulnerabilities identified during the scan require vulnerability test case determination and execution. If a determination is made that additional vulnerabilities require vulnerability test case determination and execution, at Event 508, test case(s) are determined for the additional vulnerability and, at Event 510, the tests case(s) are executed. If the tests case(s) confirm/verify the additional vulnerability, at Event 514, the policies and/or actions are identified, at Event 516, the security score is recalculated/updated and, at Event 518, a security report is generated and communicated to parties of concern. Events 508-518 occur iteratively until all vulnerabilities identified in the scan have undergone vulnerability test case determination and execution.

If a determination is made that no further vulnerabilities require vulnerability test case determination and execution, at Decision 522, a determination is made as to whether the security score (i.e., the final security score) meets the security score threshold. If a determination is made that the security score meets the security score threshold, at Event 524, the software application is continued to be deployed/executed in the computing environment. If a determination is made that the security score does not meet the security score threshold, at Event 526, further corrective actions are required/taken to address (e.g., overcome or override) the vulnerability(s).

Referring to FIG. 5, a flow diagram is depicted of a method for intelligent detection and confirmation of vulnerabilities in software applications, in accordance with embodiments of the present invention. At Event 610, machine learning algorithms embodied in an intelligent agent which is in communication with a software application may be implemented to identify a change to (i) the code of the software application or (ii) the computing environment in which the software application is deployed. The change to the code may be an intentional change, such as changes made by developer of the software application during initial development or revisions/updates. In addition, the change to the code may be unintentional, such as changes made by a malicious actor attempting to inject a script in the code or otherwise perform wrongful actions. Changes to the computing environment may include, but are not limited to, movement of the software code from one computing environment to another computing environment (e.g., software repository to test computing environment, test computing environment to production environment and the like), changes in hardware or underlying (e.g., patching of an operating system) or downstream/upstream software or the like.

In response to identifying a change to (i) the code of the software application or (ii) the computing environment in which the software application is deployed, at Event 620, vulnerability data sources (e.g., OWASP, social media sites, internal data sources and the like) are polled for retrieval of current listings of vulnerabilities and machine learning algorithms are implemented to scan the code of the software application to identify vulnerabilities from amongst those in the listings. Thus, the identification of changes to either the code itself or the computing environment in which the software application is deployed serves as the trigger for subsequent scanning of the code of the software application for known vulnerabilities.

In response to the scan resulting in the identification of one or more vulnerabilities and for each of the one or more vulnerabilities, at Event 630, machine learning algorithms of the intelligent agent are implemented to determine, which in specific embodiments involves creating/generating, vulnerability test case(s) for a corresponding vulnerability. Each vulnerability test case is configured to replicate the corresponding vulnerability in a specific computing environment. Thus, for software applications deployed (or to be deployed) in more than one computing environments, a corresponding number of test cases are determined/created. Once the test cases are determined, the software application is executed on the vulnerability tests cases to confirm or deny that the corresponding vulnerability poses a security threat to the software application.

In response to the test cases confirming that the corresponding vulnerability poses a security threat, at Event 640, a (i) policy associated with the vulnerability and/or (ii) actions required to be taken to eliminate or mitigate the vulnerability are identified. Identification may occur by accessing a database that stores policies and actions mapped to vulnerabilities. Such policies and actions may be internally-generated or acquired from external sources, such as OWASP or the like. Further, a report is generated and communicated to entities of concern that includes the identification of the vulnerability, results of the test cases and, in some embodiments, (i) the policy and/or (ii) the actions required to eliminate/mitigate the vulnerability.

FIG. 6 illustrates an exemplary machine learning (ML) subsystem architecture 700, in accordance with embodiments of the present invention. The machine learning subsystem 700 may include a data acquisition engine 702, data ingestion engine 710, data pre-processing engine 716, ML model tuning engine 722, and inference engine 736.

The data acquisition engine 702 may identify various internal and/or external data sources to generate, test, and/or integrate new features for training the machine learning model 724. These internal and/or external data sources 704, 706, and 708 may be initial locations where the data originates or where physical information is first digitized. The data acquisition engine 702 may identify the location of the data and describe connection characteristics for access and retrieval of data. In some embodiments, data is transported from each data source 704, 706, or 708 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, these data sources may include Enterprise Resource Planning (ERP) databases 704 that host data related to day-to-day business activities such as accounting, procurement, project management, exposure management, supply chain operations, and/or the like, mainframe 706 that is often the entity's central data processing center, edge devices 708 that may be any piece of hardware, such as sensors, actuators, gadgets, appliances, or machines, that are programmed for certain applications and can transmit data over the internet or other networks, and/or the like. The data acquired by the data acquisition engine 702 from these data sources may then be transported to the data ingestion engine 710 for further processing.

Depending on the nature of the data imported from the data acquisition engine 702, the data ingestion engine 710 may move the data to a destination for storage or further analysis. Typically, the data imported from the data acquisition engine 702 may be in varying formats as they come from different sources, including RDBMS, other types of databases, S3 buckets, CSVs, or from streams. Since the data comes from different sources, it needs to be cleansed and transformed so that it can be analyzed together with data from other sources. At the data ingestion engine 702, the data may be ingested in real-time, using the stream processing engine 712, in batches using the batch data warehouse 714, or a combination of both. The stream processing engine 712 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 714 collects and transfers data in batches according to scheduled intervals, trigger events, or any other logical ordering.

In machine learning, the quality of data and the useful information that can be derived therefrom directly affects the ability of the machine learning model 724 to learn. The data pre-processing engine 716 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 716 may implement feature extraction and/or selection techniques to generate training data 718. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 718 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 722 may be used to train a machine learning model 724 using the training data 718 to make predictions or decisions without explicitly being programmed to do so. The machine learning model 724 represents what was learned by the selected machine learning algorithm 720 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, and the like), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, and the like), an instance-based method (e.g., k-nearest neighbor, learning vector quantization, self-organizing map, and the like), a regularization method (e.g., ridge regression, least absolute shrinkage and selection operator, elastic net, and the like), a decision tree learning method (e.g., classification and regression tree, iterative dichotomiser 3, C4.5, chi-squared automatic interaction detection, decision stump, random forest, multivariate adaptive regression splines, gradient boosting machines, and the like), a Bayesian method (e.g., naïve Bayes, averaged one-dependence estimators, Bayesian belief network, and the like), a kernel method (e.g., a support vector machine, a radial basis function, and the like), a clustering method (e.g., k-means clustering, expectation maximization, and the like), an associated rule learning algorithm (e.g., an Apriori algorithm, an Eclat algorithm, and the like), an artificial neural network model (e.g., a Perceptron method, a back-propagation method, a Hopfield network method, a self-organizing map method, a learning vector quantization method, and the like), a deep learning algorithm (e.g., a restricted Boltzmann machine, a deep belief network method, a convolution network method, a stacked auto-encoder method, and the like), a dimensionality reduction method (e.g., principal component analysis, partial least squares regression, Sammon mapping, multidimensional scaling, projection pursuit, and the like), an ensemble method (e.g., boosting, bootstrapped aggregation, Ada-Boost, stacked generalization, gradient boosting machine method, random forest method, and the like), and/or the like.

To tune the machine learning model, the ML model tuning engine 722 may repeatedly execute cycles of experimentation (initialization) 726, testing 728, and calibration/tuning 730 to optimize the performance of the machine learning algorithm 720 and refine the results in preparation for deployment of those results for consumption or decision making. To this end, the ML model tuning engine 722 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 718. A fully trained machine learning model 732 is one whose hyperparameters are tuned and model accuracy maximized.

The trained machine learning model 732, similar to any other software application output, can be persisted to storage, file, memory, or application, or looped back into the processing component to be reprocessed. More often, the trained machine learning model 732 is deployed into an existing production environment to make practical business decisions based on live data 734. To this end, the machine learning subsystem 700 uses the inference engine 736 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 738) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C1, C_2 . . . C_n 738) live data 734 based on how similar they are to one another to solve exploratory challenges where little is known about the data, provide a description or label (e.g., C_1, C_2 . . . C_n 738) to live data 734, such as in classification, and/or the like. These categorized outputs, groups (clusters), or labels are then presented to the user input system 130. In still other cases, machine learning models that perform regression techniques may use live data 734 to predict or forecast continuous outcomes.

It will be understood that the embodiment of the machine learning subsystem 700 illustrated in FIG. 8 is exemplary and that other embodiments may vary. As another example, in some embodiments, the machine learning subsystem 700 may include more, fewer, or different components.

Thus, present embodiments of the invention discussed in detail above, the present invention provides for an end-to-end approach for (i) identifying potential vulnerabilities in software applications, including security vulnerabilities, (ii) verifying/confirming the potential vulnerabilities as actual vulnerabilities and (iii) in response, identifying the necessary remedial actions necessary to eliminate or at least mitigate the vulnerabilities. Specifically, the invention relies on an intelligent agent that is plugged-in to an application development and deployment system or the applications and is configured to detect a change to the application's code or computing environment and, as a result of detection of changes computing environment, identify potential vulnerabilities, verify/confirm the potential vulnerabilities as actual vulnerabilities through determination/creation and execution of vulnerability test cases and automatically identify the necessary remedial actions necessary to eliminate or at least mitigate the vulnerabilities.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for enterprise-wide detection and confirmation of security vulnerabilities in software applications, the system comprising:
a plurality of software applications including internally generated software applications and acquired third-party software applications, each software application comprising code;
a computing platform including a memory and one or more computing processor devices in communication with the memory, wherein the memory stores an intelligent agent including one or more machine learning algorithms, wherein the intelligent agent is in communication with each of the plurality of software applications, executable by at least one of the one or more computing processor devices and configured to, for each of the plurality of software applications:
implement at least one of the one or more machine learning algorithms to identify changes in (i) the code of a software application, and (ii) a computing environment in which the software application is deployed,
in response to identifying (i) or (ii):
poll one or more vulnerability data sources to retrieve listings of vulnerabilities, and
implement at least one of the one or more machine learning algorithms to scan the software application to identify vulnerabilities from amongst the listings of vulnerabilities,
in response to the scan resulting in identification of one or more vulnerabilities, for each of the one or more vulnerabilities;
implement at least one of one or more machine learning algorithms to determine one or more vulnerability test cases for a corresponding vulnerability, wherein each vulnerability test case is configured to replicate the corresponding vulnerability in a specific computing environment in which the software application is or will be deployed in, and
execute the software application on the one or more vulnerability test cases to confirm or deny that the corresponding vulnerability poses a security threat to the software application, and
in response to confirming that the corresponding vulnerability poses the security threat to the software application:
identify at least one of (a) a policy associated with the confirmed vulnerability, and (b) one or more actions required to eliminate or mitigate the confirmed vulnerability, and
generate and communicate a report to one or more entities suited to address the confirmed vulnerability, wherein the report includes results of the one or more vulnerability test cases and at least one of (a) and (b).

2. The system of claim 1, wherein the intelligent agent is further configured to implement the at least one of one or more machine learning algorithms to determine the one or more vulnerability test cases for a corresponding vulnerability, wherein the intelligent agent is further configured to:
determine whether a pre-existing vulnerability test case exists for the vulnerability and the specific computing environment,
in response to determining that the pre-existing vulnerability test case does exist, execute the software application on the pre-existing vulnerability test, and,
in response to determining that the pre-existing vulnerability test case does not exist, generate a vulnerability test case specific to the corresponding vulnerability and a specific computing environment in which the software application is or will be deployed in.

3. The system of claim 1, wherein the intelligent agent is further configured to, in response to executing the software application on the one or more vulnerability test cases, calculate a security score for the software application that indicates a security health of the software application based at least on results of the one or more vulnerability test cases for the corresponding vulnerability.

4. The system of claim 3, wherein the intelligent agent is further configured to calculate a security score for the software application that indicates the security health of the software application based further on at least one of (a) the policy associated with the confirmed vulnerability, and (b) one or more actions required to eliminate or mitigate the confirmed vulnerability.

5. The system of claim 3, wherein the intelligent agent is further configured to implement at least one of the one or more machine learning algorithms to scan the software application to identify the one or more vulnerabilities from amongst the listings of vulnerabilities, wherein the one or more vulnerabilities comprise a plurality of vulnerabilities, and wherein the intelligent agent is further configured to, in response to sequentially executing the software application on the one or more vulnerability test cases for each of the plurality vulnerabilities, re-calculate the security score for the software application based at least on results of the one or more vulnerability test cases for each of the plurality of vulnerabilities having undergone vulnerability test case execution.

6. The system of claim 5, wherein the intelligent agent is further configured to:
in response to executing the software application on the one or more vulnerability test cases for all of the plurality vulnerabilities, calculate a final security score for the software application based at least on results of the one or more vulnerability test cases for all of the plurality of vulnerabilities, and
compare the final security score to a threshold final security score to determine whether the security health of the software application warrants deployment to a next stage computing environment or continued execution in a currently deployed computing environment.

7. The system of claim 1, wherein the intelligent agent includes the one or more machine learning algorithms, wherein the machine learning algorithms include an on-policy reinforcement learning algorithm.

8. The system of claim 7, wherein the on-policy reinforcement learning algorithm is a State Action Reward State Action (SARSA) algorithm.

9. The system of claim 1 wherein the intelligent agent includes the one or more machine learning algorithms, wherein the machine learning algorithms include a neural network.

10. The system of claim 1, wherein the intelligent agent is further configured to in response to detecting (i) or (ii), poll the one or more vulnerability data sources to retrieve listings of vulnerabilities, wherein the vulnerability data sources include at least one of Open Web Application Security Project (OWASP), one or more social media sites, and one or more internal data sources.

11. A computer-implemented method for enterprise-wide detection and confirmation of security vulnerabilities in software applications, the method being executable by one or more computing processor devices and comprising:
  implementing at least one machine learning algorithm embodied in an intelligent agent plugged into a software application to identify changes in (i) the code of the software application and (ii) a computing environment in which the software application is deployed;
  in response to identifying (i) or (ii):
    polling one or more vulnerability data sources to retrieve listings of vulnerabilities; and
    implementing at least one machine learning algorithm embodied in the intelligent agent plugged into the software application to scan the software application to identify vulnerabilities from amongst the listings of vulnerabilities;
  in response to the scan resulting in identification of one or more vulnerabilities, for each of the one or more vulnerabilities;
    implementing at least one machine learning algorithm embodied in the intelligent agent plugged into the software application to determine one or more vulnerability test cases for a corresponding vulnerability, wherein each vulnerability test case is configured to replicate the corresponding vulnerability in a specific computing environment in which the software application is or will be deployed in; and
    executing the software application on the one or more vulnerability test cases to confirm or deny that the corresponding vulnerability poses a security threat to the software application;
  in response to confirming that the corresponding vulnerability poses the security threat to the software application:
    identifying at least one of (a) a policy associated with the confirmed vulnerability, and (b) one or more actions required to eliminate or mitigate the confirmed vulnerability; and
    generating and initiating communication of a report to one or more entities suited to address the confirmed vulnerability, wherein the report includes results of the one or more vulnerability test cases and at least one of (a) and (b).

12. The computer-implemented method of claim 11, wherein implementing the one or more machine learning algorithms to determine the one or more vulnerability test cases for a corresponding vulnerability further comprises:
  determining whether a pre-existing vulnerability test case exists for the vulnerability and the specific computing environment,
  in response to determining that the pre-existing vulnerability test case does exist, executing the software application on the pre-existing vulnerability test, and,
  in response to determining that the pre-existing vulnerability test case does not exist, generating a vulnerability test case specific to the corresponding vulnerability and a specific computing environment in which the software application is or will be deployed in.

13. The computer-implemented method of claim 11, further comprising, in response to executing the software application on the one or more vulnerability test cases, calculating a security score for the software application that indicates a security health of the software application based at least on results of the one or more vulnerability test cases for the corresponding vulnerability and at least one of (a) the policy associated with the confirmed vulnerability, and (b) one or more actions required to eliminate or mitigate the confirmed vulnerability.

14. The computer-implemented method of claim 13, wherein the one or more vulnerabilities comprise a plurality of vulnerabilities, and wherein the computer-implemented method further comprises, in response to sequentially executing the software application on the one or more vulnerability test cases for each of the plurality vulnerabilities, re-calculating the security score for the software application based at least on results of the one or more vulnerability test cases for each of the plurality of vulnerabilities having undergone vulnerability test case execution.

15. The computer-implemented method of claim 14, further comprising,
  in response to executing the software application on the one or more vulnerability test cases for all of the plurality vulnerabilities:
    calculating a final security score for the software application based at least on results of the one or more vulnerability test cases for all of the plurality of vulnerabilities; and
    comparing the final security score to a threshold final security score to determine whether the security health of the software application warrants deployment to a next stage computing environment or continued execution in a currently deployed computing environment.

16. A computer program product comprising:
  a non-transitory computer-readable medium comprising sets of codes for causing one or more computing devices to:
  implement at least one machine learning algorithm embodied in an intelligent agent plugged into a software application to identify changes in (i) the code of the software application and (ii) a computing environment in which the software application is deployed;
  in response to identifying (i) or (ii):
    poll one or more vulnerability data sources to retrieve listings of vulnerabilities; and
    implement at least one machine learning algorithm embodied in the intelligent agent plugged into the software application to scan the software application to identify vulnerabilities from amongst the listings of vulnerabilities;
  in response to the scan resulting in identification of one or more vulnerabilities, for each of the one or more vulnerabilities;
    implement at least one machine learning algorithm embodied in the intelligent agent plugged into the software application to determine one or more vulnerability test cases for a corresponding vulnerability, wherein each vulnerability test case is configured to replicate the corresponding vulnerability in a specific computing environment in which the software application is or will be deployed in; and
    execute the software application on the one or more vulnerability test cases to confirm or deny that the corresponding vulnerability poses a security threat to the software application;
  in response to confirming that the corresponding vulnerability poses the security threat to the software application:

identify at least one of (a) a policy associated with the confirmed vulnerability, and (b) one or more actions required to eliminate or mitigate the confirmed vulnerability; and generate and initiate communication of a report to one or more entities suited to address the confirmed vulnerability, wherein the report includes results of the one or more vulnerability test cases and at least one of (a) and (b).

17. The computer program product of claim 16, wherein the set of codes for causing the one or more computing devices to implement the one or more machine learning algorithms to determine the one or more vulnerability test cases for a corresponding vulnerability are further configured to cause the one or more computing devices to:

determine whether a pre-existing vulnerability test case exists for the vulnerability and the specific computing environment;

in response to determining that the pre-existing vulnerability test case does exist, execute the software application on the pre-existing vulnerability test; and, in response to determining that the pre-existing vulnerability test case does not exist, generate a vulnerability test case specific to the corresponding vulnerability and a specific computing environment in which the software application is or will be deployed in.

18. The computer program product of claim 16, wherein the sets of codes further comprise sets of codes configured to cause the one or more computing devices to:

in response to executing the software application on the one or more vulnerability test cases, calculate a security score for the software application that indicates a security health of the software application based at least on results of the one or more vulnerability test cases for the corresponding vulnerability and at least one of (a) the policy associated with the confirmed vulnerability, and (b) one or more actions required to eliminate or mitigate the confirmed vulnerability.

19. The computer program product of claim 18, wherein the one or more vulnerabilities comprise a plurality of vulnerabilities, and wherein the sets of codes further comprise sets of codes configured to cause the one or more computing devices to:

in response to sequentially executing the software application on the one or more vulnerability test cases for each of the plurality vulnerabilities, re-calculate the security score for the software application based at least on results of the one or more vulnerability test cases for each of the plurality of vulnerabilities having undergone vulnerability test case execution.

20. The computer program product of claim 19, wherein the sets of codes further comprise sets of codes configured to cause the one or more computing devices to:

in response to executing the software application on the one or more vulnerability test cases for all of the plurality vulnerabilities:

calculate a final security score for the software application based at least on results of the one or more vulnerability test cases for all of the plurality of vulnerabilities; and compare the final security score to a threshold final security score to determine whether the security health of the software application warrants deployment to a next stage computing environment or continued execution in a currently deployed computing environment.

\* \* \* \* \*